United States Patent
Brilliant et al.

(10) Patent No.: US 11,428,242 B2
(45) Date of Patent: *Aug. 30, 2022

(54) COMPRESSOR FLOWPATH

(71) Applicant: RAYTHEON TECHNOLOGIES CORPORATION, Farmington, CT (US)

(72) Inventors: Lisa I. Brilliant, Middletown, CT (US); Becky E. Rose, Colchester, CT (US); Yuan Dong, Glastonbury, CT (US); Stanley J. Balamucki, The Villages, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 435 days.

This patent is subject to a terminal disclaimer.

(21) Appl. No.: 16/715,528

(22) Filed: Dec. 16, 2019

(65) Prior Publication Data

US 2020/0240436 A1 Jul. 30, 2020

Related U.S. Application Data

(63) Continuation of application No. 15/084,643, filed on Mar. 30, 2016, now Pat. No. 10,544,802, which is a
(Continued)

(51) Int. Cl.
*F02K 3/06* (2006.01)
*F04D 29/54* (2006.01)
(Continued)

(52) U.S. Cl.
CPC .............. *F04D 29/547* (2013.01); *F02K 3/04* (2013.01); *F02K 3/06* (2013.01); *F04D 19/028* (2013.01);
(Continued)

(58) Field of Classification Search
CPC .... F04D 29/547; F04D 25/045; F04D 29/563; F04D 29/321; F04D 19/028; F04D 29/522; F04D 29/681; F02K 3/06; F02K 3/04

See application file for complete search history.

(56) References Cited

U.S. PATENT DOCUMENTS 2,672,726 A 3/1954 Wolf
2,798,360 A 7/1957 Hazen
(Continued)

FOREIGN PATENT DOCUMENTS

EP 1013889 8/2005

OTHER PUBLICATIONS

Gunston, B. (2000). Jane's Aero-Engines. Issue 7, Mar. 2000. p. 510-512.
(Continued)

*Primary Examiner* — Richard A Edgar
*Assistant Examiner* — Behnoush Haghighian
(74) *Attorney, Agent, or Firm* — Carlson, Gaskey & Olds, P.C.

(57) ABSTRACT

A compressor section for a gas turbine engine according to an example of the present disclosure includes, among other things, a low pressure compressor including a plurality of rotor blades arranged about an axis, a high pressure compressor, and a core flowpath passing through the low pressure compressor. The core flowpath at the low pressure compressor defines an inner diameter and an outer diameter relative to the axis. The outer diameter has a slope angle relative to the axis.

20 Claims, 3 Drawing Sheets

Related U.S. Application Data continuation of application No. 13/409,305, filed on Mar. 1, 2012, now abandoned.

(60) Provisional application No. 61/593,001, filed on Jan. 31, 2012.

(51) Int. Cl.

| | | |
|---|---|---|
| *F04D 29/68* | (2006.01) | |
| *F02K 3/04* | (2006.01) | |
| *F04D 29/52* | (2006.01) | |
| *F04D 19/02* | (2006.01) | |
| *F04D 25/04* | (2006.01) | |
| *F04D 29/32* | (2006.01) | |
| *F04D 29/56* | (2006.01) | |

(52) U.S. Cl.
CPC ......... *F04D 25/045* (2013.01); *F04D 29/321* (2013.01); *F04D 29/522* (2013.01); *F04D 29/563* (2013.01); *F04D 29/681* (2013.01); *F05D 2220/3217* (2013.01); *F05D 2220/36* (2013.01); *F05D 2260/606* (2013.01)

(56) References Cited

U.S. PATENT DOCUMENTS

| | | |
|---|---|---|
| 3,066,912 A | 12/1962 | Scheper |
| 3,673,802 A | 7/1972 | Krebs et al. |
| 3,680,309 A | 8/1972 | Wallace, Jr. |
| 3,761,042 A | 9/1973 | Denning |
| 3,792,586 A | 2/1974 | Kasmarik |
| 3,925,979 A | 12/1975 | Ziegler |
| 4,104,876 A | 8/1978 | Larsen |
| 4,704,862 A | 11/1987 | Dennison |
| 4,782,658 A | 11/1988 | Perry |
| 4,827,712 A | 5/1989 | Coplin |
| 5,123,240 A | 6/1992 | Frost |
| 5,127,794 A | 7/1992 | Burge et al. |
| 5,380,155 A | 1/1995 | Varsik et al. |
| 5,806,303 A | 9/1998 | Johnson |
| 5,809,772 A | 9/1998 | Giffin, III et al. |
| 5,845,482 A | 12/1998 | Carscallen |
| 5,867,980 A | 2/1999 | Bartos |
| 6,148,518 A | 11/2000 | Weiner et al. |
| 6,203,273 B1 | 3/2001 | Weiner et al. |
| 6,240,719 B1 | 6/2001 | Vondrell |
| 6,338,609 B1 | 1/2002 | Decker et al. |
| 6,766,639 B2 | 4/2004 | Malmborg |
| 7,004,722 B2 | 2/2006 | Teramura et al. |
| 7,487,630 B2 | 2/2009 | Weiler |
| 7,694,505 B2 | 4/2010 | Schilling |
| 7,883,315 B2 | 2/2011 | Suciu |
| 2005/0106009 A1 | 5/2005 | Cummings et al. |
| 2005/0265825 A1 | 12/2005 | Lewis |
| 2006/0090451 A1 | 5/2006 | Moniz et al. |
| 2006/0130456 A1 | 6/2006 | Suciu et al. |
| 2006/0196164 A1 | 9/2006 | Donohue |
| 2007/0137175 A1 | 6/2007 | Moniz |
| 2007/0251210 A1 | 11/2007 | Ceric et al. |
| 2008/0053062 A1 | 3/2008 | Tuttle |
| 2008/0072567 A1 | 3/2008 | Moniz |
| 2008/0098715 A1 | 5/2008 | Orlando et al. |
| 2009/0056306 A1 | 3/2009 | Suciu et al. |
| 2009/0185911 A1 | 7/2009 | Roberge |
| 2009/0293449 A1 | 12/2009 | Venter |
| 2010/0058735 A1 | 3/2010 | Hurwitz |
| 2010/0223903 A1 | 9/2010 | Starr |
| 2010/0247306 A1 | 9/2010 | Merry et al. |

OTHER PUBLICATIONS

International Preliminary Report on Patentability for PCT Application No. PCT/US2013/022020 dated Aug. 14, 2014.

Walsh, P.P. and Fletcher, P. (2004). Gas turbine performance, 2nd Edition. Oxford, UK: Blackwell Science. pp. 159-177.

International Search Report for PCT Application No. PCT/US2013/022020 completed Sep. 7, 2013.

COMPRESSOR FLOWPATH

CROSS-REFERENCE TO RELATED APPLICATION

The present application is a continuation of U.S. patent application Ser. No. 15/084,643, filed Mar. 30, 2016, which is a continuation of U.S. patent application Ser. No. 13/409,305, filed Mar. 1, 2012, which claims priority to U.S. Provisional Application No. 61/593,001, which was filed on Jan. 31, 2012, and is incorporated herein by reference.

TECHNICAL FIELD

The present application relates generally to gas turbine engines, and more particularly to a low pressure compressor flowpath for a gas turbine engine.

BACKGROUND OF THE INVENTION

Commercial turbofan engines use low pressure compressors coupled to a fan. Advances in coupling the fan to the low pressure compressor have allowed the compressor to operate at higher speeds and to decrease the number of compressor stages required of the compressor. Decreasing the number of stages and increasing the rotational speed of the low pressure compressor causes existing flowpath designs to be non-optimal and results in decreased performance when the existing flowpath designs are used.

SUMMARY OF THE INVENTION

A compressor section for a gas turbine engine according to an example of the present disclosure includes a low pressure compressor including a plurality of rotor blades arranged about an axis, a high pressure compressor including a greater number of stages than the low pressure compressor, and a core flowpath passing through the low pressure compressor. The core flowpath at the low pressure compressor defines an inner diameter and an outer diameter relative to the axis. The outer diameter has a slope angle relative to the axis, and the slope angle is between 10 degrees and 15 degrees relative to the axis.

In a further embodiment of any of the foregoing embodiments, the slope angle slopes toward the axis along a fluid flow direction of the core flowpath.

In a further embodiment of any of the foregoing embodiments, the outer diameter is defined by one of the plurality of rotor blades.

In a further embodiment of any of the foregoing embodiments, the inner diameter of the core flowpath increases through the low pressure compressor along a fluid flow direction.

In a further embodiment of any of the foregoing embodiments, the low pressure compressor includes at least one variable vane situated in the core flowpath.

In a further embodiment of any of the foregoing embodiments, the low pressure compressor includes an exit guide vane located in a low pressure compressor outlet section of the core flowpath.

In a further embodiment of any of the foregoing embodiments, the low pressure compressor includes a low pressure bleed located between a low pressure compressor rotor and the exit guide vane, and the low pressure bleed includes a bleed trailing edge configured to extend into the core flowpath beyond the outer diameter of the core flowpath.

In a further embodiment of any of the foregoing embodiments, the low pressure compressor is a multi-stage compressor.

In a further embodiment of any of the foregoing embodiments, the low pressure compressor is a three stage compressor, and the high pressure compressor includes a greater number of stages than the low pressure compressor.

A gas turbine engine according to an example of the present disclosure includes a fan section, a compressor section including a low pressure compressor defining an axis, a high pressure compressor including a greater number of stages than the low pressure compressor, and a core flowpath passing through the low pressure compressor. A turbine section includes a high pressure turbine and a low pressure turbine. The low pressure turbine is configured to drive the low pressure compressor and the fan section. The low pressure turbine includes a greater number of stages than the low pressure compressor, and the low pressure compressor includes a greater number of stages than the high pressure turbine. The core flowpath has an inner diameter and an outer diameter relative to the axis, and the outer diameter has a slope angle that is between 10 degrees and 15 degrees relative to the axis.

In a further embodiment of any of the foregoing embodiments, the gas turbine engine is a two-spool turbofan.

In a further embodiment of any of the foregoing embodiments, the fan delivers air into a bypass duct, and a portion of air into the compressor section, with a bypass ratio defined as the volume of air delivered into the bypass duct compared to the volume of air delivered into the compressor section, and the bypass ratio being greater than about 10.

In a further embodiment of any of the foregoing embodiments, a pressure ratio across the fan section is less than about 1.6.

In a further embodiment of any of the foregoing embodiments, a pressure ratio across the low pressure turbine is greater than about 5.

In a further embodiment of any of the foregoing embodiments, the low pressure turbine is configured to drive the fan section through a geared architecture.

A method of designing a gas turbine engine according to an example of the present disclosure includes providing a fan section, and providing a compressor section defining a longitudinal axis. The compressor section includes a low pressure compressor having a plurality of rotor blades, a high pressure compressor including a larger number of stages than the low pressure compressor, and a core flowpath passing through the low pressure compressor. A turbine section includes a high pressure turbine and a low pressure turbine. The low pressure turbine is configured to drive the low pressure compressor and the fan section, and the high pressure turbine including two stages and configured to drive the high pressure compressor. The core flowpath has an inner diameter and an outer diameter at the low pressure compressor, and the outer diameter has a positive slope angle that is less than or equal to 15 degrees such that the outer diameter slopes inwardly relative to the longitudinal axis.

In a further embodiment of any of the foregoing embodiments, the low pressure turbine includes a greater number of stages than the low pressure compressor.

In a further embodiment of any of the foregoing embodiments, the slope angle is between approximately 10 degrees and approximately 15 degrees relative to the longitudinal axis.

In a further embodiment of any of the foregoing embodiments, the low pressure compressor is a three stage compressor.

In a further embodiment of any of the foregoing embodiments, the fan section is configured to deliver air into a bypass duct, and a portion of air into the compressor section, with a bypass ratio defined as the volume of air delivered into the bypass duct compared to the volume of air delivered into the compressor section, and the bypass ratio is greater than about 10.

These and other features of the present invention can be best understood from the following specification and drawings, the following of which is a brief description.

DETAILED DESCRIPTION OF A PREFERRED EMBODIMENT

Figure 1:
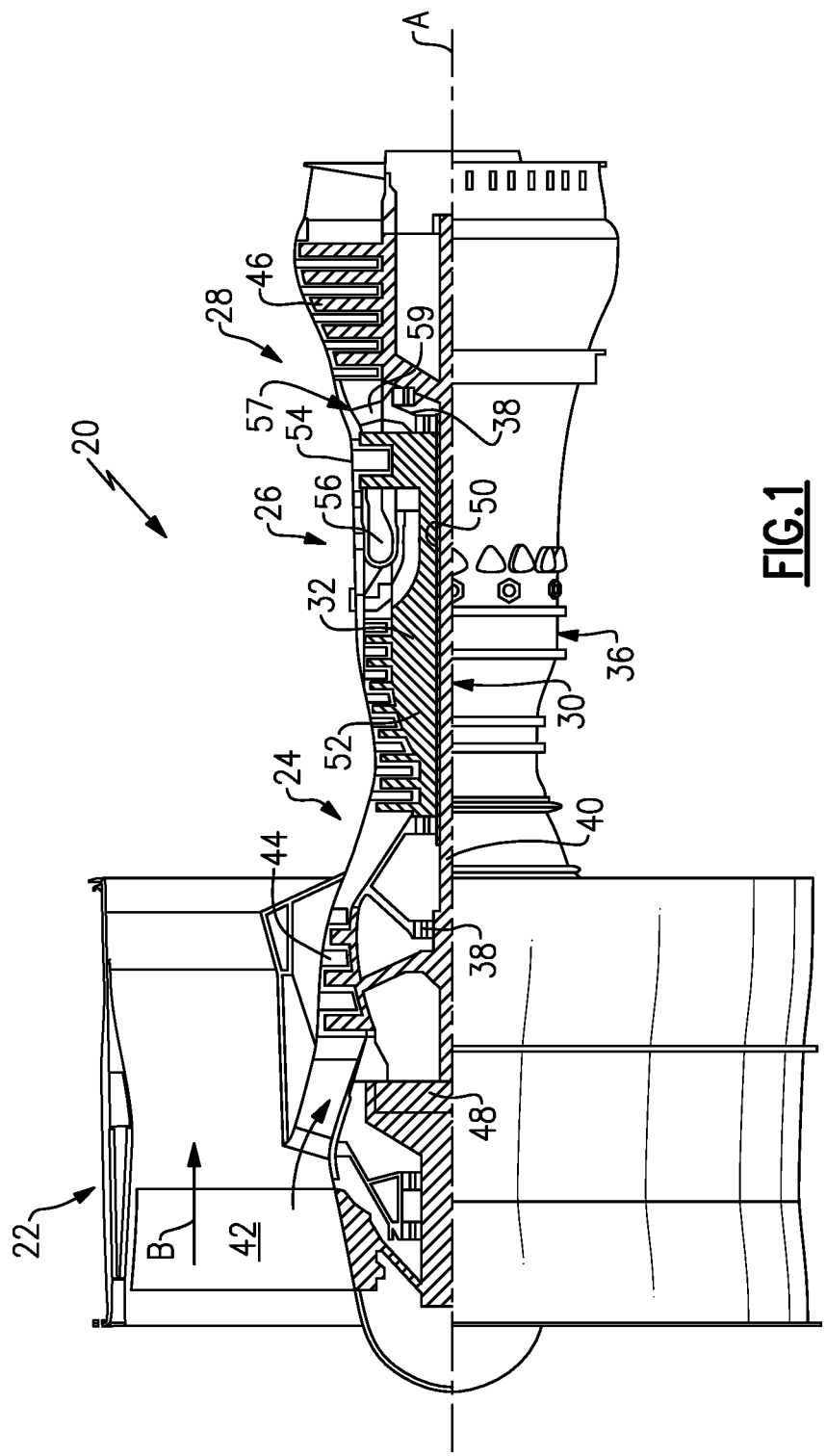
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include, for example, a three-spool design, an augmentor section, and different arrangements of sections, among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The low pressure compressor 44 is the first compressor in the core flowpath relative to the fluid flow through the core flowpath. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. The high pressure compressor 52 is the compressor that connects the compressor section to a combustor 56, and is the last illustrated compressor 52 in the illustrated example of FIG. 1 relative to the core flowpath. The combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.25 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Fan pressure ratio" is the pressure ratio across the fan blade alone, without a Fan Exit Guide Vane ("FEGV") system present. The low fan pressure ratio as disclosed herein according to one non-limiting embodiment is less than about 1.6. "Low corrected fan tip speed" is the actual fan tip speed in ft/sec divided by an industry standard temperature correction of $[(Tambient\ deg\ R)/518.7)^{\wedge}0.5]$. The "Low corrected fan tip speed" as disclosed herein according to one non-limiting embodiment is less than about 1250 ft/second.

Figure 2:
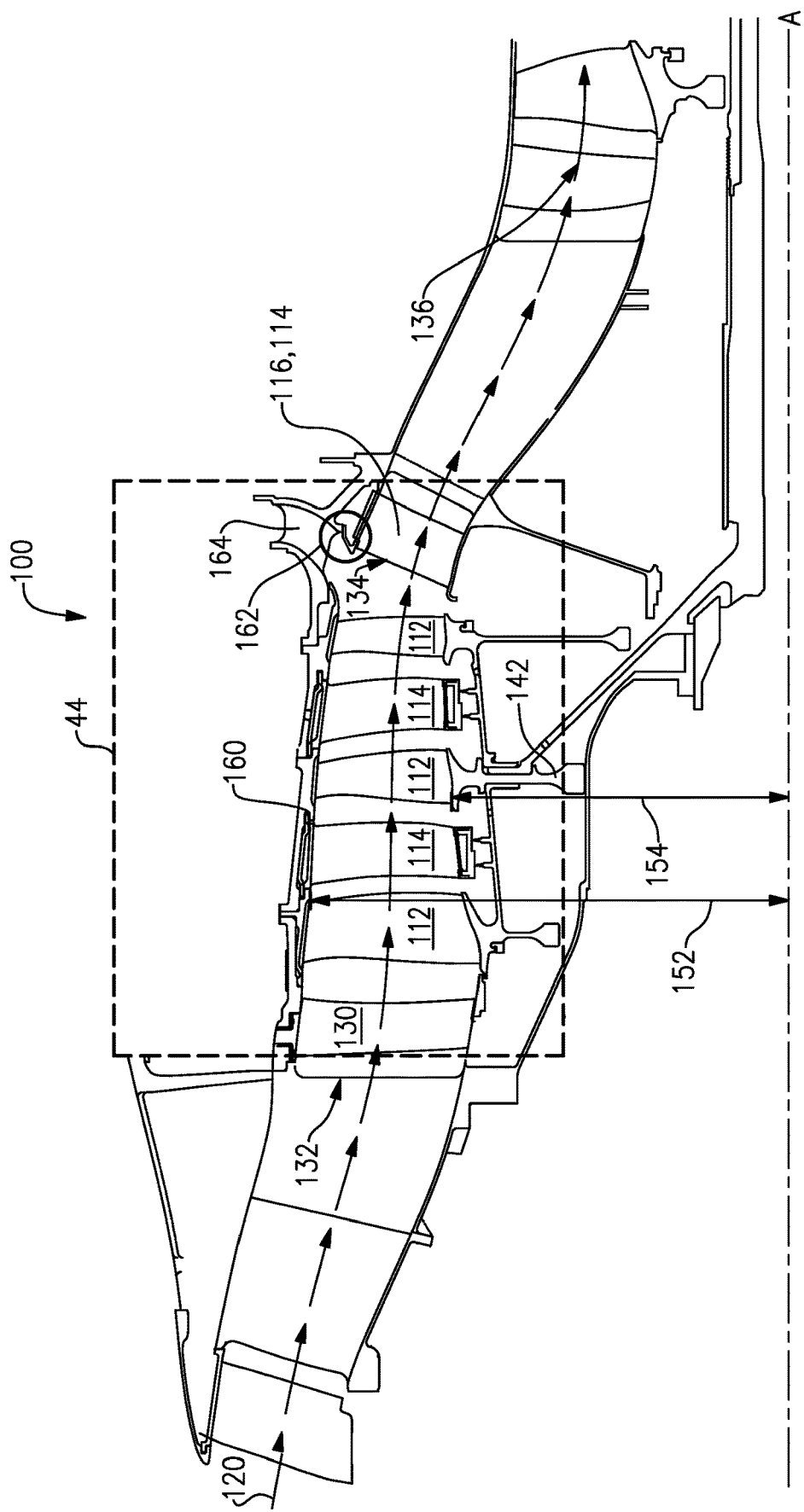
FIG. 2 contextually illustrates an example core flowpath through a low pressure compressor of the gas turbine engine of FIG. 1.

With continued reference to FIG. 1, FIG. 2 is a sectional view of the gas turbine engine 20 of FIG. 1, contextually illustrating a low pressure compressor 44 of the gas turbine engine 20. The core flowpath, identified herein as flowpath 120 or core flowpath 120, passes through the low pressure compressor 44 of the gas-turbine engine 20. The low pressure compressor 44 includes multiple rotor 112/stator 114 pairs that serve to drive air through the core flowpath 120. The rotors 112 are connected to an inner shaft 40 via a compressor frame 142. Interspersed between each of the rotors 112 is a stator 114. The stators 114 are connected to an outer frame 160. The illustrated low pressure compressor 44 is referred to as a three stage compressor as three rotor 112/stator 114 pairs are included. Additional stages can be added or removed depending on design constraints via the addition or removal of rotor 112/stator 114 pairs. A variable guide vane 130 is located at an inlet 132 of the low pressure compressor 44. Alternately, one or more of the stators 114 could also be a variable vane 130. An exit guide vane 116 is located at a fluid outlet 134 of the low pressure compressor 44. In the illustrated example of FIG. 2, the exit guide vane 116 also acts as a stator 114 corresponding to the last rotor 112 of the low pressure compressor 44. The core flowpath 120 has an inner diameter 154 and an outer diameter 152 measured with respect to the engine longitudinal axis A. In embodiments, the outer diameter 152 is defined by one of the rotors 112, and inner diameter 154 is defined by one of the rotors 112, as illustrated in FIG. 2.

As the core flowpath 120 passes through the low pressure compressor 44, the outer diameter 152 slopes inward relative to the engine central longitudinal axis A toward the engine central longitudinal axis A. The inner diameter 154 of the core flowpath 120 slopes outward relative to the engine central longitudinal axis A away from the engine central longitudinal axis A resulting in an increasing inner diameter 154 as the core flowpath 120 progresses along the direction of fluid flow. As a result of the inward sloping outer diameter 152 and the increasing inner diameter 154, the core flowpath 120 has a lower cross sectional area at the fluid outlet 134 than at the fluid inlet 132, and air passing through the low pressure compressor 44 is compressed.

A steeper slope angle of the outer diameter 152, relative to the engine central longitudinal axis A, results in a greater average tip clearance between the rotor blade 112 and the engine case during flight. The additional tip clearance increases flow separation in the air flowing through the core flowpath 120. By way of example, undesirable amounts flow separation can occur when the outer diameter 152 exceeds 15 degrees relative to the engine central longitudinal axis A. Flow separation occurs when the air flow separates from the core flowpath 120 walls. By ensuring that the outer diameter 152 includes a sufficiently low slope angle, relative to the engine central longitudinal axis A, the flow separation resulting from the additional tip clearance is eliminated, and the total amount of flow separation is minimized. In embodiments, a slope angle of the outer diameter 152 is in a range of approximately 0 degrees to approximately 15 degrees relative to the engine central longitudinal axis A. In some example embodiments, a slope angle of the outer diameter 152 is in a range of between approximately 0 degrees and approximately 10 degrees, or more narrowly less than approximately 10 degrees, relative to the engine central longitudinal axis A. In some embodiments, the slope angle is in the range of approximately 5 degrees to 7 degrees, relative to the engine central longitudinal axis A. In another example embodiment, the slope angle of the outer diameter 152 is approximately 6 degrees relative to the engine central longitudinal axis A.

Figure 3:
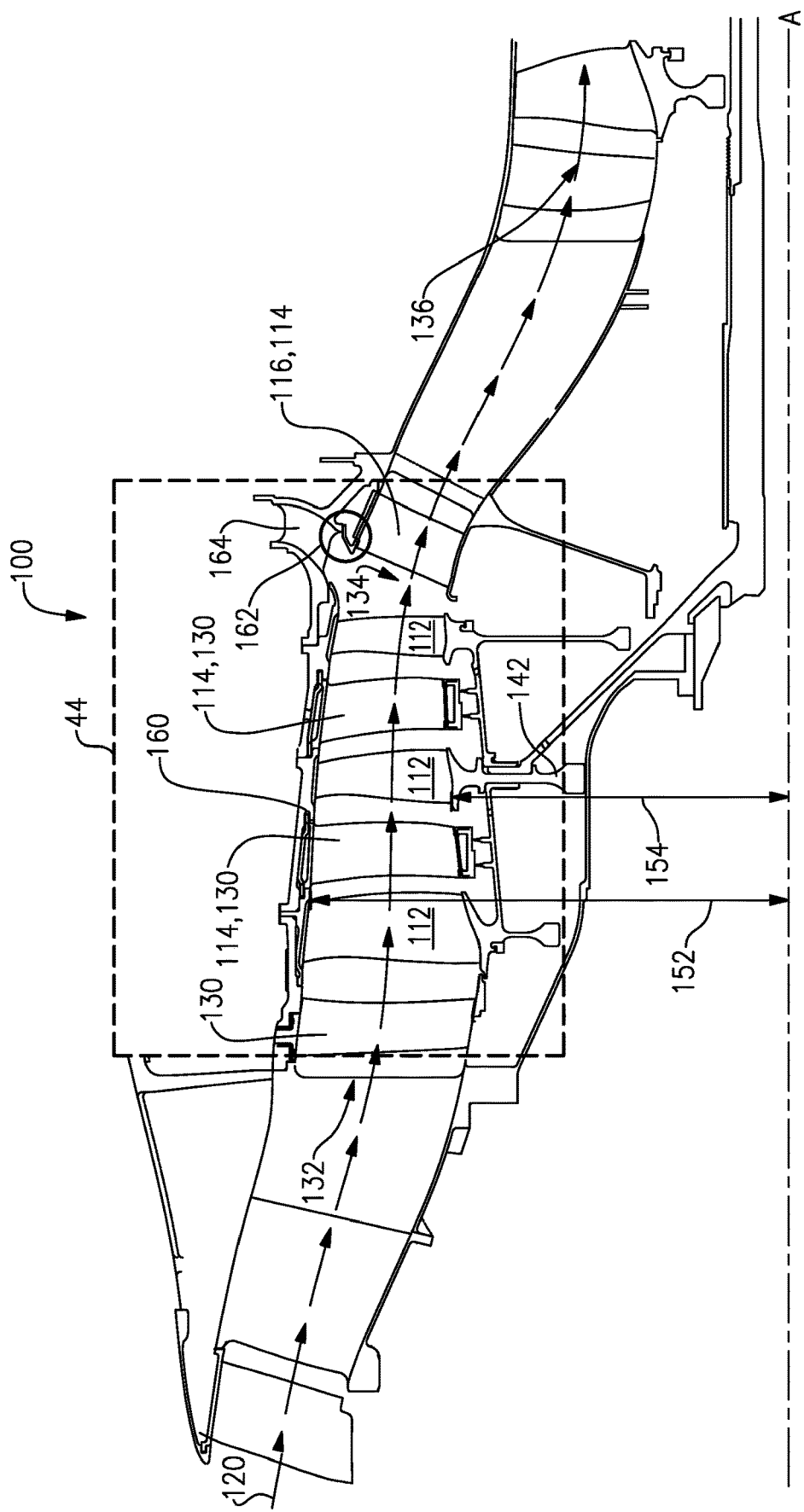
FIG. 3 contextually illustrates another example core flowpath through a low pressure compressor of the gas turbine engine of FIG. 1.

With continued reference to FIGS. 1 and 2, FIG. 3 illustrates an example core flowpath 120. In some example engine embodiments, air flow passing through the core flowpath 120 is not sufficiently stable. In order to increase the stability of the fluid flow, and improve the pressure ratio of the low pressure compressor 44, one or more variable guide vanes 130 are included in the flow path 120. In a three stage geared turbofan compressor 44, such as the one illustrated in FIG. 2, a single variable guide vane 130 can be utilized to sufficiently stabilize the air flow. However, alternate embodiments, such as those utilizing additional compressor stages, may require additional variable guide vanes 130. In such an embodiment, one or more of the stators 114 can be the additional variable guide vanes 130. In alternate examples, the air flow can be sufficiently stable without the inclusion of a variable guide vane 130, and the variable guide vane 130 can be omitted.

In some example embodiments the exit guide vane 116 is incorporated into a low pressure compressor outlet 134 section of the core flowpath 120 the low pressure compressor 44, and to the high pressure compressor 52. The low pressure compressor outlet 134 section of the core flowpath 120 is sloped inward (toward the engine central longitudinal axis A). Placing the exit guide vane 116 in the inward sloping low pressure compressor outlet 134 section of the core flowpath 120 cants the exit guide vane 116 and provides space for a low pressure bleed 164. The low pressure bleed 164 and allows for dirt, rain and ice to be removed from the compressor 44. The low pressure bleed 164 additionally improves the stability of the fluid flowing through the core flowpath 120. The low pressure bleed 164 is positioned between the rotors 112 and the exit guide vane 116. In some example embodiments a bleed trailing edge 162 of the low pressure bleed 164 can extend inward toward the engine central longitudinal axis A, beyond the outer diameter 152 of the core flowpath 120. In such an embodiment the outer diameter of the bleed trailing edge 162 of the low pressure bleed 164 is smaller than the outer diameter 152. Extending the bleed trailing edge 162 inwards allows the bleed 164 to scoop out more of the dirt, rain, ice or other impurities that enter the core flowpath 120.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
   a fan section including a fan surrounded by an outer housing;
   a compressor section including a low pressure compressor having three stages defining an axis, a high pressure compressor including a greater number of stages than the low pressure compressor, and a core flowpath passing through the low pressure compressor;
   a turbine section including a high pressure turbine having two stages and a low pressure turbine having five stages, the high pressure turbine driving the high pressure compressor, and the low pressure turbine driving the low pressure compressor and the fan section; and
   wherein the core flowpath in the low pressure compressor has an inner diameter and an outer diameter relative to the axis, the outer diameter has a slope angle that is between 10 degrees and 15 degrees relative to the axis, and wherein the inner diameter of the core flowpath increases through the low pressure compressor along a fluid flow direction; and
   wherein the fan delivers air into a bypass duct, and a portion of air into the compressor section, with a bypass ratio defined as the volume of air delivered into the bypass duct compared to the volume of air delivered into the compressor section, and the bypass ratio being greater than 10.

2. The gas turbine engine of claim 1, wherein the slope angle slopes toward the axis along a fluid flow direction of the core flowpath.

3. The gas turbine engine of claim 2, wherein the outer diameter is defined by one of a plurality of rotor blades of the low pressure compressor.

4. The gas turbine of claim 1, wherein the low pressure compressor includes at least one variable vane situated in the core flowpath.

5. The gas turbine engine of claim 1, wherein the low pressure compressor includes an exit guide vane located in a low pressure compressor outlet section of the core flowpath.

6. The gas turbine engine of claim 1, wherein the gas turbine engine is a two-spool turbofan.

7. The gas turbine engine of claim 1, wherein a pressure ratio across the fan section is less than 1.6 across the fan blade alone.

8. The gas turbine engine of claim 7, wherein the low pressure turbine includes an inlet, an outlet, a pressure ratio greater than 5, the pressure ratio of the low pressure turbine being pressure measured prior to the inlet as related to pressure at the outlet prior to an exhaust nozzle.

9. The gas turbine engine of claim 8, wherein:
the gas turbine engine is a two-spool turbofan;
the slope angle slopes toward the axis along a fluid flow direction of the core flowpath;
the low pressure turbine includes a greater number of stages than the low pressure compressor; and
the low pressure compressor includes a greater number of stages than the high pressure turbine.

10. The gas turbine engine of claim 9, wherein the fan section has only a single fan stage comprising the fan.

11. The gas turbine engine of claim 9, wherein the outer diameter is defined by one of a plurality of rotor blades of the low pressure compressor.

12. The gas turbine engine of claim 9, wherein the low pressure compressor includes an exit guide vane located in a low pressure compressor outlet section of the core flowpath.

13. The gas turbine of claim 9, wherein the low pressure compressor includes at least one variable vane situated in the core flowpath.

14. A gas turbine engine comprising:
a fan section including a fan surrounded by an outer housing;
a compressor section including a three-stage low pressure compressor defining an axis, a high pressure compressor including a greater number of stages than the low pressure compressor, and a core flowpath passing through the low pressure compressor;
a turbine section including a two-stage high pressure turbine and a low pressure turbine including five stages, the high pressure turbine driving the high pressure compressor, the low pressure turbine driving the low pressure compressor and driving the fan section through a geared architecture, the low pressure turbine including a greater number of stages than the low pressure compressor, the low pressure compressor including a greater number of stages than the high pressure turbine; and
wherein the core flowpath within the low pressure compressor has an inner diameter and an outer diameter relative to the axis, the outer diameter has a slope angle that is less than 10 degrees relative to the axis, and wherein the inner diameter of the core flowpath increases through the low pressure compressor along a fluid flow direction; and
wherein the fan delivers air into a bypass duct, and a portion of air into the compressor section, with a bypass ratio defined as the volume of air delivered into the bypass duct compared to the volume of air delivered into the compressor section, and the bypass ratio being greater than 10.

15. The gas turbine engine of claim 14, wherein the slope angle is between 5 degrees and 7 degrees.

16. The gas turbine engine of claim 15, wherein the slope angle slopes toward the axis along a fluid flow direction of the core flowpath.

17. The gas turbine engine of claim 16, wherein the outer diameter is defined by one of a plurality of rotor blades of the low pressure compressor.

18. The gas turbine engine of claim 15, wherein a pressure ratio across the fan section is less than 1.6 across the fan blade alone.

19. The gas turbine engine of claim 18, wherein the low pressure turbine includes an inlet, an outlet, a pressure ratio greater than 5, the pressure ratio of the low pressure turbine being pressure measured prior to the inlet as related to pressure at the outlet prior to an exhaust nozzle.

20. The gas turbine engine of claim 19, wherein:
the geared architecture is an epicyclic gear train;
a gear reduction ratio of the epicyclic gear train is greater than 2.25;
the gas turbine engine is a two-spool turbofan;
the slope angle slopes toward the axis along a fluid flow direction of the core flowpath; and
the fan section has only a single fan stage comprising the fan.

* * * * *